(12) United States Patent
Rajurkar et al.

(10) Patent No.: US 9,439,225 B2
(45) Date of Patent: Sep. 6, 2016

(54) RAPID NETWORK ACQUISITION AND OVERHEAD MESSAGE STORAGE FOR MACHINE-TO-MACHINE DEVICES

(75) Inventors: Anand Rajurkar, Hyderabad (IN); Bhaskara V. Batchu, Hyderabad (IN); Aditya Bohra, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 105 days.

(21) Appl. No.: 13/593,130

(22) Filed: Aug. 23, 2012

(65) Prior Publication Data

US 2014/0056215 A1 Feb. 27, 2014

(51) Int. Cl.
*H04W 76/02* (2009.01)
*H04W 48/20* (2009.01)
*H04W 48/16* (2009.01)

(52) U.S. Cl.
CPC ............. *H04W 76/02* (2013.01); *H04W 48/20* (2013.01); *H04W 48/16* (2013.01)

(58) Field of Classification Search
None
See application file for complete search history.

(56) References Cited

U.S. PATENT DOCUMENTS

| | | | |
|---|---|---|---|
| 6,374,103 B1 * | 4/2002 | Kamel et al. | 455/434 |
| 7,187,943 B1 * | 3/2007 | Lee | 455/525 |
| 7,483,699 B2 | 1/2009 | Karmi et al. | |
| 7,623,503 B2 * | 11/2009 | An et al. | 370/345 |
| 2003/0190937 A1 * | 10/2003 | Karmi et al. | 455/574 |
| 2004/0248572 A1 * | 12/2004 | Ormson | 455/434 |
| 2006/0046661 A1 * | 3/2006 | Ekvetchavit et al. | 455/67.11 |
| 2007/0072550 A1 * | 3/2007 | Wang | 455/63.1 |
| 2010/0130237 A1 | 5/2010 | Kitazoe et al. | |
| 2010/0136914 A1 | 6/2010 | Keshav et al. | |
| 2011/0159880 A1 * | 6/2011 | Kumar et al. | 455/450 |
| 2011/0177815 A1 * | 7/2011 | Jeong et al. | 455/436 |
| 2011/0201343 A1 | 8/2011 | Pinheiro et al. | |

(Continued)

FOREIGN PATENT DOCUMENTS

| | | |
|---|---|---|
| EP | 1641292 A1 | 3/2006 |
| EP | 2365676 A1 | 9/2011 |

(Continued)

OTHER PUBLICATIONS

International Search Report and Written Opinion—PCT/US2012/052321—ISA/EPO—May 6, 2013.

(Continued)

*Primary Examiner* — Hassan Kizou
*Assistant Examiner* — Tejis Daya
(74) *Attorney, Agent, or Firm* — Larry J. Moskowitz

(57) ABSTRACT

A stationary access terminal, such as a stationary remote sensor, capable of wireless communication with a network is provided. The access terminal obtains sector information associated with a wireless network node by establishing a communication link with the network node. The access terminal then stores the sector information in non-volatile memory, and later retrieves the sector information from the memory, for example, after a subsequent boot up or wake up event. The stored sector information is used by the access terminal to establish a subsequent communication link with the network node, and may include at least one of channel, band, and pseudo-random number sequence information. The access terminal may also store overhead messages received from the network node in the non-volatile memory. The stored overhead messages may later be retrieved to establish system operating parameters of the network node after the subsequent boot up or wake up event.

35 Claims, 12 Drawing Sheets

(56) References Cited

U.S. PATENT DOCUMENTS

| | | |
|---|---|---|
| 2011/0249636 A1 | 10/2011 | Cherian et al. |
| 2011/0300889 A1* | 12/2011 | Lee et al. ............... 455/509 |
| 2012/0057476 A1 | 3/2012 | Chan et al. |
| 2012/0088505 A1 | 4/2012 | Toh et al. |
| 2012/0155404 A1 | 6/2012 | Shin et al. |

FOREIGN PATENT DOCUMENTS

| | | |
|---|---|---|
| WO | 03036875 A2 | 5/2003 |
| WO | 2005067181 A1 | 7/2005 |

OTHER PUBLICATIONS

Chapter II Demand and Article 34 Amendments With Response to Written Opinion—PCT/US2012/052321—ISA/EPO—Aug. 23, 2013.

Written Opinion of the International Preliminary Examining Authority—PCT/US2012/082321—ISA/EPO—Sep. 4, 2014.

Response to Second Written Opinion—PCT/US2012/052321—ISA/EPO—Sep. 29, 2014.

Notification of Transmittal of the International Preliminary Report on Patentability—PCT/US2012/082321—ISA/EPO—May 11, 2014.

\* cited by examiner

RAPID NETWORK ACQUISITION AND OVERHEAD MESSAGE STORAGE FOR MACHINE-TO-MACHINE DEVICES

BACKGROUND

Field

Various features relate to wireless communication devices and systems, and more particularly to methods and apparatuses for improved network acquisition and overhead message storage techniques for stationary devices.

Modern machine-to-machine (M2M) communications are a form of communication where electronic devices, such as electronic sensors and computers, communicate with one another using modern networking technology. For example, an access terminal, such as a remote sensor, may gather and send data wirelessly to a network, where it may then be routed, for example through the Internet, to a server. The server may then analyze the data and certain actions may be taken. Thus, rather than building a new, exclusive communication line between the remote sensor and server, existing networks, such as cellular networks, the Internet, etc. may be utilized to transmit the data.

M2M technology may be found in many industries and applications, including aerospace, agricultural, water treatment monitoring, and wildlife science. For example, wildlife scientists may fit an animal with a radio collar sensor that transmits location information and other vital statistics about the animal to the scientists using an existing network. The data received may be processed by computers remotely located from the animal, thereby allowing scientists to learn crucial information about the animal's habits and biological processes.

As another example, remote, stationary access terminals, such as stationary sensors, may be placed at fixed locations throughout a geographical area to monitor water levels and/or water quality. The stationary access terminals may transmit the water level and/or quality information to a server located at a water treatment facility that supplies water to a local community. The information may be transmitted from the stationary access terminals to base stations of an existing cellular network (e.g., mobile phone network). The base stations in turn transmit the information through other network nodes in the cellular network and/or the Internet in order to supply the information to the server, which is also communicatively coupled to the Internet and/or the cellular network. As just one example, the water treatment facility may treat the water with specific chemicals based on the information received from the stationary access terminals. This may improve the facility's performance, efficiency, and also reduce costs.

In some cases the one or more access terminals, such as remote sensors, of an M2M communications system are designed for use with existing cellular networks (e.g., mobile phone networks). As such, the remote sensors are in some aspects configured to act like standard mobile devices in the way they establish communications with base stations of the cellular network. For example, the remote sensors may be equipped with software and/or hardware that causes them to execute algorithms and follow specific protocols used to locate a base station, and establish communications with the base station. These algorithms and/or protocols may have originally been designed to be particularly useful or advantageous—if not necessary—for mobile devices to establish communications with the cellular network. However, such algorithms and/or protocols may be disadvantageous in some respects for use with a remote sensor of an M2M communications system where the remote sensor's geographical position is predominantly fixed and stationary. For example, such algorithms and/or protocols may unnecessarily lengthen the amount of time it takes the remote sensor to acquire network connectivity, and also reduce the battery life of the sensor.

Thus, there is a need for improved communication devices, methods, and systems for M2M communications that utilize stationary access terminals having improved network acquisition capabilities.

SUMMARY

One feature provides a method for wireless communication operable at a stationary access terminal. The method includes obtaining sector information associated with a wireless network node by establishing a communication link with the wireless network node, the sector information comprising at least one of channel information, band information, and/or pseudo-random number (PN) sequence information, storing the sector information in a memory circuit associated with the stationary access terminal, retrieving the sector information from the memory circuit, and establishing a subsequent communication link with the wireless network node utilizing the stored sector information. According to one aspect, obtaining the sector information includes searching a plurality of band, channel, and PN sequence combinations according to a preferred roaming list to establish the communication link with the wireless network node. According to another aspect, the method further includes terminating the communication link with the wireless network node prior to establishing the subsequent communication link with the wireless network node.

According to one aspect, the method further includes receiving an overhead message and a configuration sequence number associated with the overhead message from the wireless network node via the subsequent communication link. According to another aspect, the method further includes transitioning from a system non-idle state to a system idle state prior to receiving the overhead message and the configuration sequence number associated with the overhead message. According to one example, the system non-idle state is either a system initialization state, a system access state, or a system traffic channel state. According to one aspect, the method further includes determining that the received configuration sequence number is not a function of a stored configuration sequence number that is stored in the memory circuit associated with the stationary access terminal, and receiving additional overhead messages from the wireless network node via the subsequent communication link to establish system operating parameters associated with the wireless network node. Alternatively, the method further includes determining that the received configuration sequence number is a function of a stored configuration sequence number that is stored in the memory circuit associated with the stationary access terminal, and retrieving one or more stored overhead messages from the memory circuit to establish system operating parameters associated with the wireless network node. According to one example, the stored overhead messages indicate at least one of a slot cycle index value, an initial transmit power for the stationary access terminal, and/or a search window size for pilot channel detection. According to another example, the received configuration sequence number is equal to the stored configuration sequence number. According to yet another example, the wireless network node is a base station and the stationary access terminal is a stationary sensor device.

According to one aspect, obtaining and storing the sector information occurs after an initial boot up event of the stationary access terminal, and establishing the subsequent communication link with the wireless network node utilizing the stored sector information occurs after a subsequent boot up event or a wake up event of the stationary access terminal, where the initial boot up event occurs before the subsequent boot up event or the wake up event. According to another aspect, the method further includes receiving at least one first overhead message and a first configuration sequence number associated with the first overhead message from the wireless network node via the communication link, and storing the first overhead message and the first configuration sequence number in the memory circuit of the stationary access terminal. According to yet another aspect, the method further includes transitioning from a system non-idle state to a system idle state after storing the first overhead message and the first configuration sequence number, receiving a second configuration sequence number from the wireless network node via the subsequent communication link, comparing the stored first configuration sequence number with the received second configuration sequence number, determining that the stored first configuration sequence number is a function of the received second configuration sequence number, and retrieving the stored first overhead message from the memory circuit to establish system operating parameters associated with the wireless network node.

According to one aspect, the method further includes receiving a second overhead message along with the second configuration sequence number, where the second configuration sequence number is associated with the second overhead message. According to one example, receiving the first overhead message and the first configuration sequence number from the wireless network node via the communication link occurs after an initial boot up event. According to another example, retrieving the first overhead message stored in the memory circuit of the stationary access terminal occurs after a subsequent boot up event or a wake up event, and the initial boot up event occurs before the subsequent boot up event or the wake up event.

Another feature provides a stationary access terminal that includes a communication interface adapted to establish communications with a wireless network node, and a processing circuit communicatively coupled to the communication interface. The processing circuit is adapted to obtain sector information associated with the wireless network node by establishing a communication link with the wireless network node, the sector information comprising at least one of channel information, band information, and/or pseudo-random number (PN) sequence information, store the sector information in a memory circuit associated with the stationary access terminal, retrieve the sector information from the memory circuit, and establish a subsequent communication link with the wireless network node utilizing the stored sector information. According to one aspect, the processing circuit is further adapted to search a plurality of band, channel, and PN sequence combinations according to a preferred roaming list to establish the communication link with the wireless network node.

According to another aspect, the processing circuit is further adapted to receive at least one first overhead message and a first configuration sequence number associated with the first overhead message from the wireless network node via the communication link, and store the first overhead message and the first configuration sequence number in the memory circuit of the stationary access terminal. According to yet another aspect, the processing circuit is further adapted to transition from a system non-idle state to a system idle state after storing the first overhead message and the first configuration sequence number, receive a second configuration sequence number from the wireless network node via the subsequent communication link, compare the stored first configuration sequence number with the received second configuration sequence number, determine that the stored first configuration sequence number is a function of the received second configuration sequence number, and retrieve the stored first overhead message from the memory circuit to establish system operating parameters associated with the wireless network node.

According to one aspect, the processing circuit is further adapted to receive a second overhead message along with the second configuration sequence number, where the second configuration sequence number is associated with the second overhead message. According to another aspect, the processing circuit adapted to receive the first overhead message and the first configuration sequence number from the wireless network node via the communication link occurs after an initial boot up event. According to another aspect, the processing circuit adapted to retrieve the first overhead message stored in the memory circuit of the stationary access terminal occurs after a subsequent boot up event or a wake up event, where the initial boot up event occurs before the subsequent boot up event or the wake up event.

Another feature provides a stationary access terminal that includes a means for obtaining sector information associated with a wireless network node by establishing a communication link with the wireless network node, the sector information comprising at least one of channel information, band information, and/or pseudo-random number (PN) sequence information, a means for storing the sector information in a memory circuit associated with the stationary access terminal, a means for retrieving the sector information from the memory circuit, and a means for establishing a subsequent communication link with the wireless network node utilizing the stored sector information. According to one aspect, the stationary access terminal further includes a means for receiving at least one first overhead message and a first configuration sequence number associated with the first overhead message from the wireless network node via the communication link, a means for storing the first overhead message and the first configuration sequence number in the memory circuit of the stationary access terminal, a means for transitioning from a system non-idle state to a system idle state after storing the first overhead message and the first configuration sequence number, a means for receiving a second configuration sequence number from the wireless network node via the subsequent communication link, a means for comparing the stored first configuration sequence number with the received second configuration sequence number, a means for determining that the stored first configuration sequence number is a function of the received second configuration sequence number, and a means for retrieving the stored first overhead message from the memory circuit to establish system operating parameters associated with the wireless network node.

Another feature provides a computer-readable medium having instructions stored thereon for wireless communication, the instructions which when executed by at least one processor cause the processor to obtain sector information associated with a wireless network node by establishing a communication link with the wireless network node, the sector information comprising at least one of channel information, band information, and/or pseudo-random number (PN) sequence information, store the sector information in a memory circuit associated with the stationary access terminal, retrieve the sector information from the memory circuit, and establish a subsequent communication link with the wireless network node utilizing the stored sector information. According to one aspect, the instructions which when executed by the processor further cause the processor to receive at least one first overhead message and a first configuration sequence number associated with the first overhead message from the wireless network node via the communication link, store the first overhead message and the first configuration sequence number in the memory circuit of the stationary access terminal, transition from a system non-idle state to a system idle state after storing the first overhead message and the first configuration sequence number, receive a second configuration sequence number from the wireless network node via the subsequent communication link, compare the stored first configuration sequence number with the received second configuration sequence number, determine that the stored first configuration sequence number is a function of the received second configuration sequence number, and retrieve the stored first overhead message from the memory circuit to establish system operating parameters associated with the wireless network node.

DETAILED DESCRIPTION

In the following description, specific details are given to provide a thorough understanding of the various aspects of the disclosure. However, it will be understood by one of ordinary skill in the art that the aspects may be practiced without these specific details. For example, circuits may be shown in block diagrams in order to avoid obscuring the aspects in unnecessary detail. In other instances, well-known circuits, structures and techniques may not be shown in detail in order not to obscure the aspects of the disclosure.

The word "exemplary" is used herein to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. As used herein, the term "stationary" when used in conjunction with access terminals and sensor devices (also referred to herein as "remote sensors," "wireless sensors," and "sensors") means that the access terminal's or sensor device's location is predominantly fixed while the access terminal or sensor device is deployed out for use in the field. However, although the location of the access terminal or sensor device is predominantly fixed while in use, the stationary access terminal or stationary sensor device may still be moved from one location to a new location for use at the new location.

Overview

A stationary access terminal, such as a stationary remote sensor device, capable of wireless communication with an M2M communications network is provided. The access terminal obtains sector information associated with a wireless network node, such as a base station, by establishing a communication link with the network node. The access terminal then stores the sector information in non-volatile memory, and later retrieves the sector information from the memory, for example, after a subsequent boot up or wake up event. The stored sector information is used by the access terminal to establish a subsequent communication link with the network node, and may include at least one of channel, band, and pseudo-random number sequence information. The access terminal may also store overhead messages received from the network node in the non-volatile memory. The stored overhead messages may later be retrieved to establish system operating parameters of the network node after the subsequent boot up or wake up event.

Exemplary Network Environment

Figure 1:
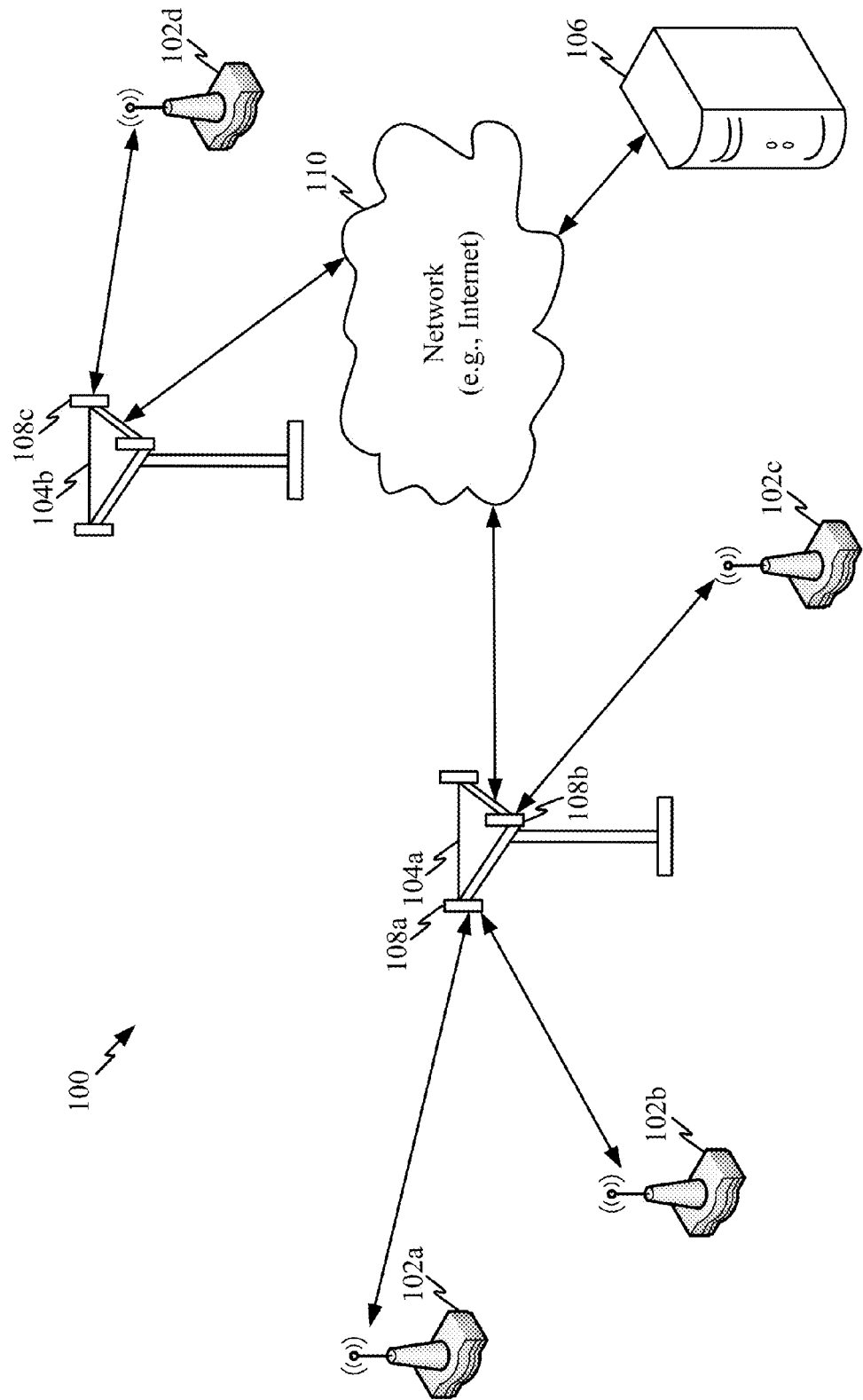
FIG. 1 is a block diagram illustrating an exemplary machine-to-machine (M2M) network environment where various access terminals transmit data to a server through one or more network nodes.

FIG. 1 is a block diagram illustrating an exemplary machine-to-machine (M2M) network environment 100 where various access terminals transmit data to a server through one or more network nodes. According to one example, the M2M network 100 includes a plurality of stationary access terminals 102a, 102b, 102c, 102d, a plurality of base stations 104a, 104b (e.g., Node B, evolved Node B, base station transceiver, basic service set, extended service set, access point, etc.), and a server 106 (e.g., computer, personal computer, etc.). The stationary access terminals 102a, 102b, 102c, 102d may be, for example, stationary sensor devices, stationary computer terminals, or some other stationary electronic device whose location is primarily fixed. A stationary sensor device may, for example, include hardware and/or software that that measures a physical quantity (e.g., temperature, water level, salinity, etc.) and converts it into a signal which can be read by an observer and/or an electronic instrument and also transmitted (e.g., wirelessly) to another device. The base stations 104a, 104b may include one or more radio heads 108a, 108b, 108c that are responsible for providing network connectivity/coverage to access terminals 102a, 102b, 102c, 102d within geographical areas known as "sectors." In the illustrated example, the base station 104a provides network connectivity (indicated by the double arrows in FIG. 1) to the access terminals 102a, 102b through one of the base station's 104a sectors serviced by the radio head 108a. Similarly, another access terminal 102c is provided network connectivity through another radio head 108b corresponding to a different sector of the base station 104a. The base station 104b may provide network connectivity to another access terminal 102d via one of its radio heads 108c.

The stationary access terminals 102a, 102b, 102c, 102d are electronic devices that may wirelessly communicate (e.g., receive instructions, transmit data, etc.) with each other or other network components, such as the base stations 104a, 104b. The access terminals 102a, 102b, 102c, 102d may be distributed across an area or terrain at various locations and may be responsible for collecting data from their surroundings, such as but not limited to, temperature data, water level and/or content data, gas quantity flow data (e.g., gas meter applications), etc. In practice the access terminals 102a, 102b, 102c, 102d may have a myriad of different uses.

The access terminals 102a, 102b, 102c, 102d may also be stationary devices in that their location may be predominantly fixed while they are deployed for use in the field. Although the location of the access terminals 102a, 102b, 102c, 102d may be predominantly fixed while in use, the stationary access terminals 102a, 102b, 102c, 102d may still be moved from one location to a new location for data collection at the new location. The stationary access terminals 102a, 102b, 102c, 102d may communicate with the base stations 104a, 104b periodically, randomly, and/or after certain event triggers (e.g., the access terminals 102a, 102b, 102c, 102d detect a rapid rise in water level). Notably, the access terminals 102a, 102b, 102c, 102d communicate less frequently with the base stations 104a, 104b then mobile access terminals or mobile devices, such as mobile phones. The frequency of communication between the access terminals 102a, 102b, 102c, 102d and the base stations 104a, 104b may depend, among other things, on the specific application for which the access terminals 102a, 102b, 102c, 102d are deployed.

The base stations 104a, 104b may be communicatively coupled to other network nodes (not shown in FIG. 1), such as radio network controllers, mobile services switching centers, home location registers, visitor location registers, gateway mobile services switching centers, etc. that may allow the base stations 104a, 104b to directly and/or indirectly communicate with private and/or public networks 110 (e.g., the Internet). In this fashion, the stationary access terminals 102a, 102b, 102c, 102d collect data from their surroundings and transmit this data to the base stations 104a, 104b, which in turn transmit the data to the server 106 via a network 110, such as the Internet. The server 106 may process and analyze the data received. As just one example, the server 106 may process water content information collected from the access terminals 102a, 102b, 102c, 102d and determine what if any additives should be added to water collected from sources near the access terminals 102a, 102b, 102c, 102d before distributing the water collected for human consumption.

According to one aspect of the present disclosure, the access terminals 102a, 102b, 102c, 102d, the base stations 104a, 104b, and/or other network nodes (not shown) may communicate with one another based on the CDMA2000® (i.e., Interim Standard (IS)-2000) family of mobile technology standards. This may include the following standards: CDMA2000® 1x Radio Transmission Technology (RTT); CDMA2000® 1x Evolution Data Optimized (EV-DO) Release 0; CDMA2000® 1xEVDO Revision A; CDMA2000® 1xEVDO Revision B; CDMA2000® 1xEV-DO Revision C or Ultra Mobile Broadband (UMB); and/or CDMA2000 1x Evolution Data Voice (EVDV). In other aspects, the access terminals 102a, 102b, 102c, 102d, the base stations 104a, 104b, and/or other network nodes (not shown) may communicate with one another based on other telecommunication systems, network architectures, and/or telecommunication standards including, but not limited to, IS-95, Long Term Evolution (LTE), LTE-Advanced (LTE-A), Institute of Electrical and Electronics Engineers (IEEE) 802.11 (Wi-Fi), IEEE 802.16 (WiMAX), IEEE 802.20, Bluetooth, and/or other systems and standards.

Network Acquisition

The telecommunication standards and/or architectures utilized by existing access terminals and base stations may have been designed for use by access terminals that are mobile. Thus, although such systems may work well for mobile access terminals, they may not work efficiently for access terminals that are stationary such as the stationary access terminals 102a, 102b, 102c, 102d depicted in FIG. 1. Therefore, the protocols and procedures for network acquisition used by the stationary access terminals 102a, 102b, 102c, 102d and the base stations 104a, 104b are optimized to take advantage of the fact that the access terminals 102a, 102b, 102c, 102d are stationary.

Figure 2A:
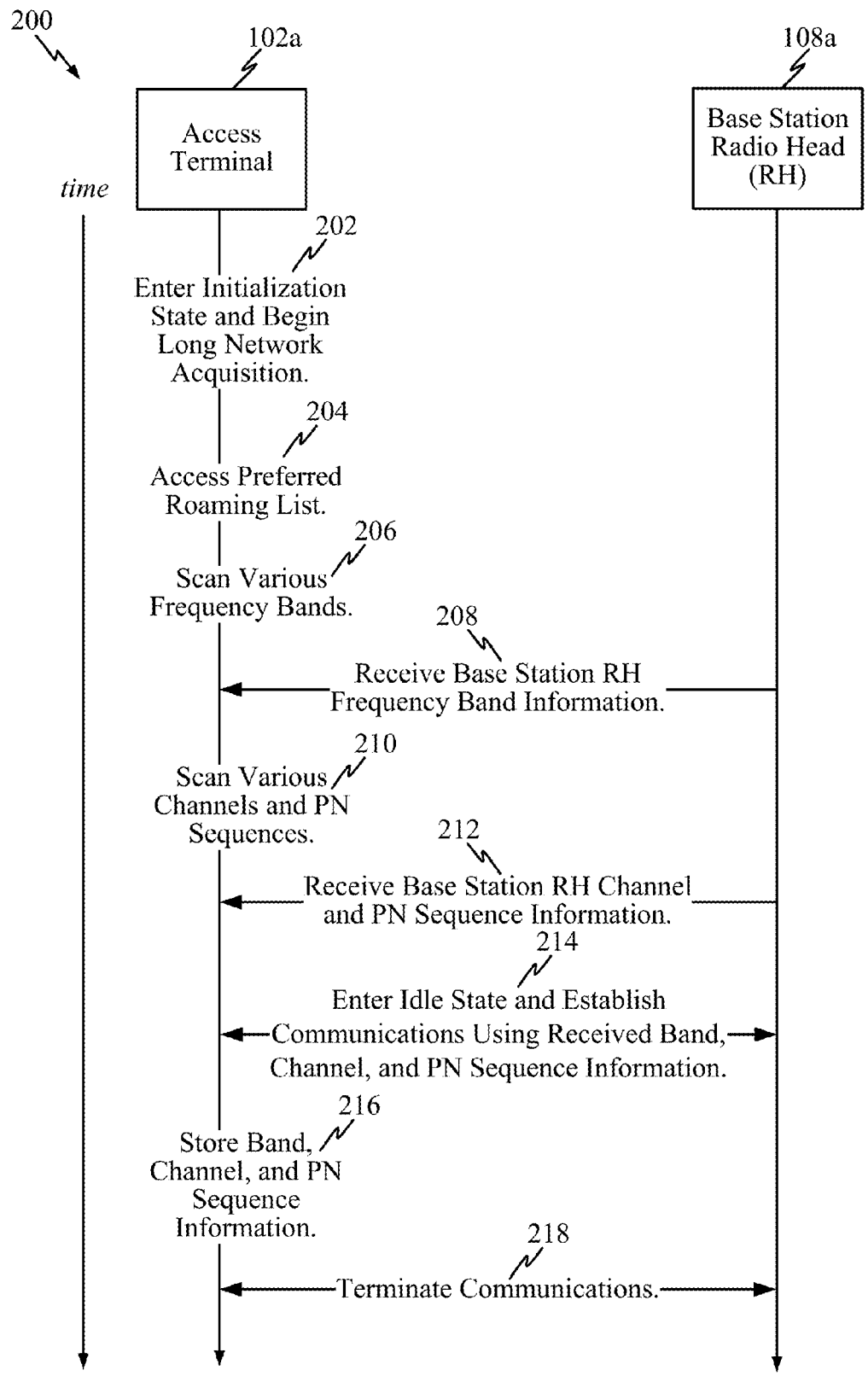
FIGS. 2A and 2B illustrate a diagram of an exemplary process for network acquisition by a stationary, remote access terminal with a base station's radio head.
Figure 2B:
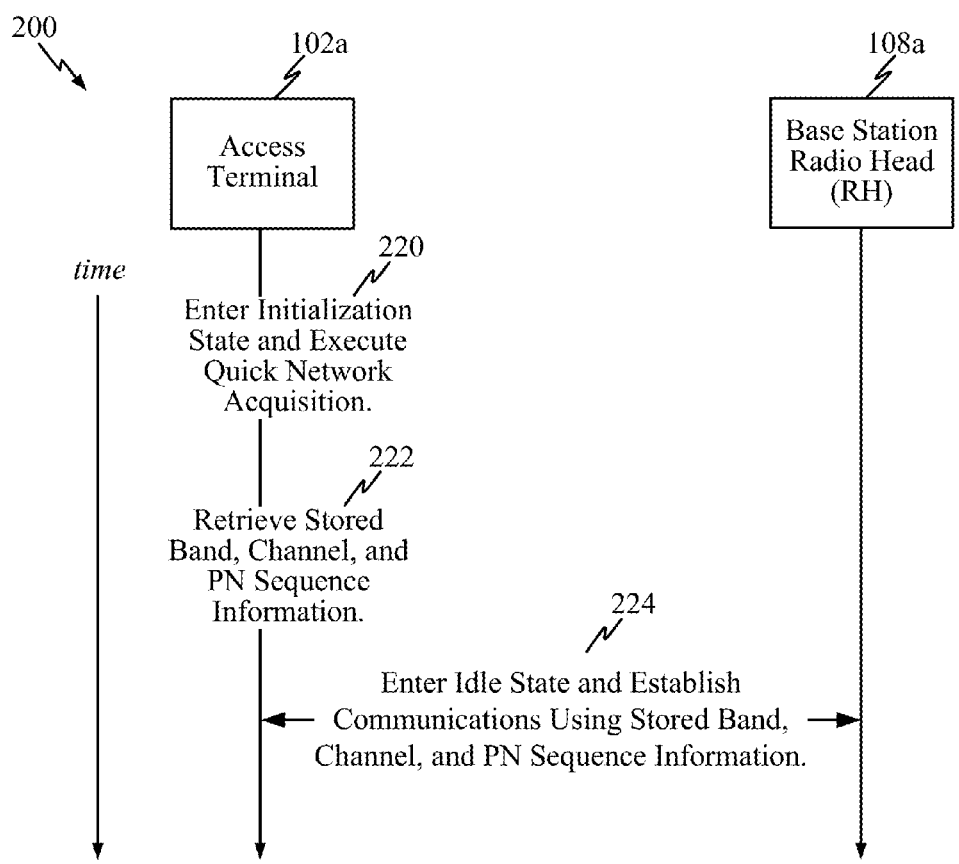

FIGS. 2A and 2B illustrate a diagram of an exemplary process 200 for network acquisition by a stationary, remote access terminal with a base station's radio head according to one aspect of the disclosure. Referring to FIG. 2A, at step 202, the stationary remote access terminal 102a may enter a system initialization state and begin a long network acquisition routine. The long network acquisition routine may be used when the access terminal 102a boots up for the first time or otherwise fails to acquire network connectivity using a quick network acquisition routine (described in greater detail below). For example, the access terminal 102a may perform the long network acquisition routine after an initial boot up event where the access terminal is powered ON for the very first time or is reset after being moved to a new stationary location. "Booting up" is the initial set of operations that an electronic device having a computer system performs when electrical power is switched ON. Consistent with the long network acquisition routine, at step 204, the access terminal 102a accesses its preferred roaming list (PRL).

The PRL is a database that contains information used during the network system selection and network acquisition process. The PRL may reside in non-volatile memory of the access terminal 102a including, for example, a removable user identity module (e.g., subscriber identity module (SIM) card) located in the access terminal 102a. The PRL may indicate which bands, sub-bands and service provider identifiers are to be scanned, and it may also indicate in what order of priority they are scanned. As one example, the PRL may consist of an acquisition table and a system table. The acquisition table is an indexed list of frequencies on which the access terminal may search for particular systems, rather than having the access terminal search the entire frequency spectrum. The information contained in each acquisition table entry may include an index, the network type, and/or the associated channel blocks. The system table may be a prioritized list of systems that the device is permitted to access (e.g., preferred systems) and those that it is explicitly forbidden to access (e.g., negative systems).

At step 206, the access terminal 102a scans various frequency bands specified in the PRL until it detects the frequency band used by the base station radio head (RH) 108a. For example, at step 208, the access terminal 102a receives frequency band information from the base station RH 108a that identifies the correct frequency band. The frequency band information (herein also referred to as "band information") may include which band class and band subclass frequency bandwidths the base station RH 108a and access terminal 102a should use for communication (transmit and receive frequency bandwidths). At step 210, the access terminal 102a scans various CDMA channels and pseudo-random number (PN) sequence (e.g., pilot channel) combinations within the frequency band until it detects the one used by the base station RH 108a. For example, at step 212, the access terminal 102a may receive CDMA channel and PN sequence information from the base station RH 108a. The CDMA channel information (herein also referred to as "channel information") identifies the center frequencies of the various CDMA channel numbers associated with the band class used for both the access terminal 102a and base station RH 108a (both transmit and receive). The PN sequence information identifies the PN sequence used by the pilot channel. Collectively, the band information, channel information, and PN sequence information may be herein known as "sector information" since the unique combination of this information may define a sector of the base station 104a. Thus, a specific combination of band, channel, and PN sequence information defines the sector used by the base station RH 108a of the base station 104a.

At step 214, the access terminal 102a may acquire network connectivity and enter a system idle state (e.g., establish communications with the base station RH 108a) using the detected/received band, channel, and PN sequence information. For example, during the system idle state the access terminal 102a may monitor a paging channel and receive overhead messages (as described in greater detail below) from the base station RH 108a. At step 216, the access terminal 102a stores the band, channel, and PN sequence information in non-volatile memory. Sometime later, at step 218, the access terminal 102a may terminate its communications with the base station RH 108a (e.g., it may turn power OFF or enter a low power mode).

Referring to FIG. 2B, sometime later at step 220, the access terminal 102a may again need to acquire network connectivity and enters a system initialization state. This time however it executes a quick network acquisition routine. For example, the access terminal 102a may have "woken up" from a low power mode or alternatively the access terminal 102a may have undergone a subsequent boot up event (i.e., a boot up event that occurs after the access terminal 102a has already performed an initial boot up event previously) thereby turning ON from a power OFF state. Consistent with the quick network acquisition routine, at step 222, the access terminal 102a retrieves the stored band, channel, and PN sequence information from its non-volatile memory. At step 224, the access terminal 102a acquires network connectivity and enters into a system idle state (e.g., establishes communications with the base station RH 108a) using the retrieved band, channel, and PN sequence information rather than spending time and resources (e.g., battery power) scanning for this information like it did initially using the long network acquisition routine (e.g., steps 206-212).

Notably, since the access terminal 102a is a stationary access terminal, it will very likely detect the same base station RH 108a every time it attempts to acquire a network connection. By contrast, a mobile access terminal or a mobile device typically does not stay in one region for very long and thus it may very likely be within range of a different base station RH when it attempts to acquire a network connection. Thus, for the stationary access terminals 102a, 102b, 102c, 102d it is advantageous and efficient to store the band, channel, and PN sequence information of the base station RH 108a that it last acquired a network connection with so that it may use this information first for subsequent network acquisitions attempts before resorting to scanning band, channel, and PN sequence combinations according to its PRL. By using the stored band, channel, and PN sequence information the access terminal 102a acquires network connectivity significantly quicker, and thus it may conserve battery life by avoiding the execution of energy consuming scanning functions. Note that in the event that the access terminal 102a is not able to acquire network connectivity with the stored band, channel, and PN sequence information in step 224 (e.g., the base station RH 108a is inactive, or the access terminal 102a has been moved to a new location), the access terminal 102a may execute the long network acquisition routine as indicated in steps 206-214 in an attempt to gain network access with a different base station.

Figure 3:
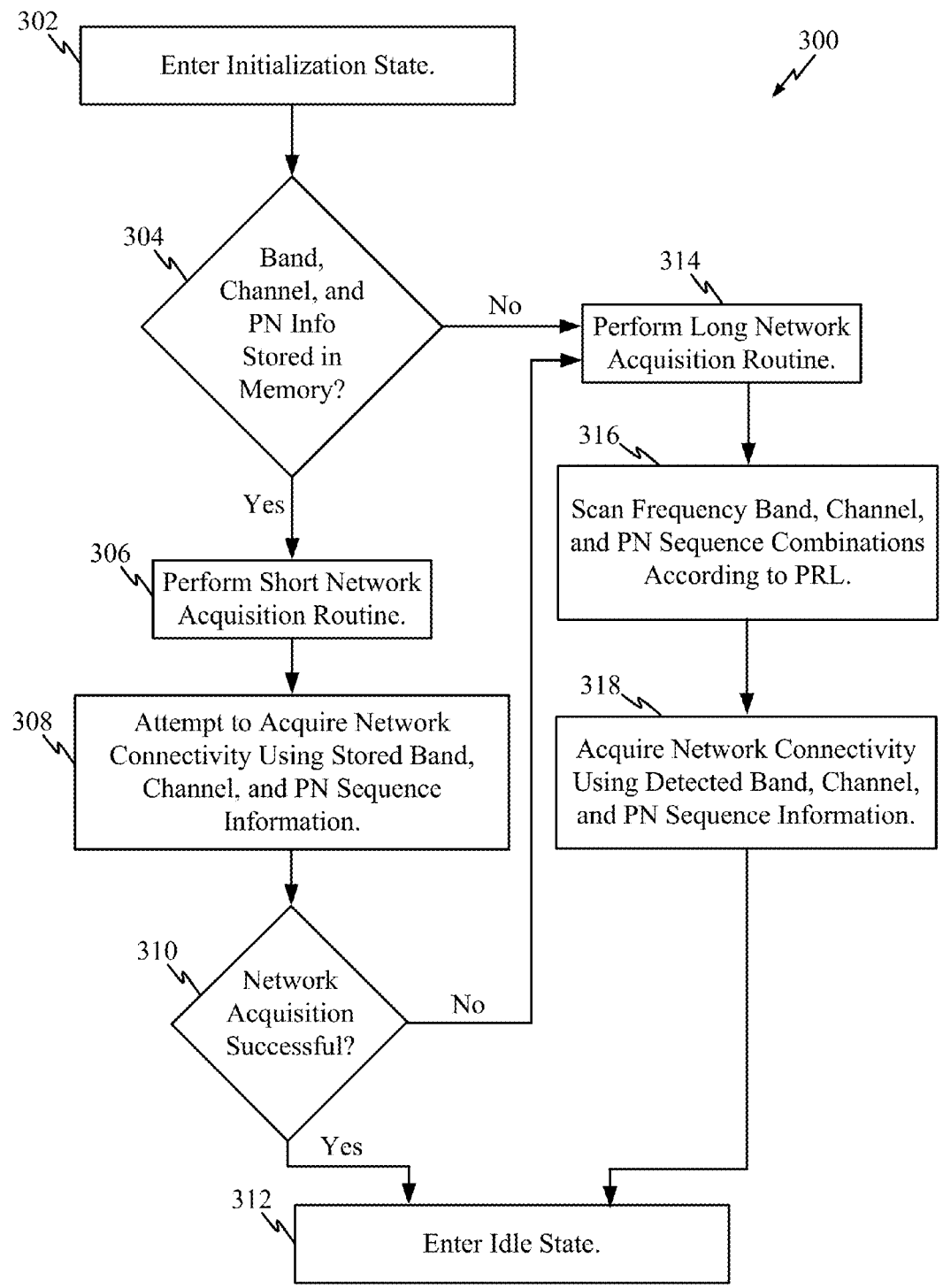
FIG. 3 illustrates a flow diagram of an exemplary process for network acquisition by a stationary remote access terminal with a base station.

FIG. 3 illustrates a flow diagram of an exemplary process 300 for network acquisition by a stationary remote access terminal with a base station according to one aspect of the disclosure. At step 302, the stationary access terminal 102a may enter a system initialization state in order to acquire a network connection and establish communications with the base station 104a (e.g., the base station RH 108a). For example, the access terminal 102a may have collected data that it desires to transmit to the server 106 for processing. At step 304, the access terminal 102a determines whether it has already stored band, channel, and/or PN sequence information in one or more memory circuits with which the access terminal 102a may be electrically or communicatively coupled to, or otherwise associated with. For example, the memory circuits may be non-volatile memory. In other aspects, the memory may be volatile memory that is continuously powered to retain the stored band, channel, and/or PN sequence information.

If the access terminal 102a determines that there is band, channel, and PN sequence information stored in its memory, then at step 306, the access terminal 102a performs a short network acquisition routine. This includes attempting to acquire a network connection (e.g., establishing communications with the base station RH 108a) using the stored band, channel, and PN sequence information as indicated by step 308. At step 310, the access terminal 102a determines whether network acquisition was successful using the stored band, channel, and PN sequence information. If the access terminal 102a determines that network acquisition was successful, then at step 312, the access terminal 102a may enter a system idle state.

If, however, the access terminal 102a determines that either the band, channel, and/or PN sequence information is not stored in its memory or it determines that network acquisition was not successful using the stored band, channel, and PN sequence information, then at step 314, the access terminal 102a performs a long network acquisition routine. As indicated in step 316, this includes performing various scanning algorithms in order to detect the band information, channel information, and PN sequence information associated with the base station 104a (e.g., the base station RH 108a). At step 318, the access terminal 102a acquires a network connection with the base station 104a (e.g., the base station RH 108a) using the detected band, channel, and PN sequence information. Upon successful network acquisition, the access terminal 102a may enter a system idle state at step 312.

Overhead Message Storage and Retrieval

As discussed briefly above, during a system idle state (e.g., steps 214, 224 of FIG. 2 or step 312 of FIG. 3) an access terminal may monitor a paging channel(s) to receive overhead messages from the base station. According to some telecommunications standards (e.g., IS-2000), the access terminal can monitor the paging channel in the system idle state in a couple of different modes, including for example, a non-slotted mode and a slotted mode. In non-slotted mode the access terminal is programmed to continuously monitor the forward paging channel(s) for overhead messages. By contrast, in slotted mode the access terminal only monitors the forward paging channel(s) at certain times (e.g., according to a specific slot index) and is in a "sleep state" during all other times. During the sleep state the access terminal powers down many active circuit elements including the transmitter and receiver to save power. The access terminal then wakes up at the preconfigured slot index values, activates its circuitry, and listens for overhead messages before going back to sleep.

An overhead message is a message sent by a base station to the remote access terminal to establish system operating parameters by communicating information that may be specific to the base station or may be common to the entire system. According to one aspect of the present disclosure, examples of overhead messages include, but are not limited to, IS-95 (i.e., CDMAOne®) and/or IS-2000 overhead messages, such as system parameters messages, extended system parameters messages, access parameters messages, neighbor list messages, CDMA channel list messages, channel assignment messages, global service redirection messages, IS-41 system parameters messages, MC-RR parameters messages, enhanced access parameters messages, extended CDMA channel list messages, and/or universal neighborhood list messages. These may be transmitted on the forward paging channel (F-PCH), forward broadcast control channel (F-BCCH), forward common control channel (F-CCCH), and/or the forward quick paging channel (F-QPCH). For example, the information contained in an overhead message may indicate the slot cycle index, initial transmit power for the access terminal device, search window size for pilot channel detection, etc. Again, these are merely some types of overhead messages associated with some communication standards. Other overhead messages according to other communication standards are also contemplated by the present disclosure.

Accompanying the overhead messages is a configuration sequence number that indicates the version of and/or identifies the overhead message. For example, the configuration sequence number may be associated with a plurality of overhead messages and helps inform the access terminal identifying information about the overhead messages (e.g., when they were generated, which base station RH they pertain to, etc.).

During a slotted mode system idle state, the access terminal periodically wakes up and listens to the paging channel to process any messages on that channel. However, the overhead messages may remain the same for a substantial period of time as the access terminal periodically wakes up and listens to the paging channel. Since it is not desirable to have the access terminal wake up, receive the overhead message, and decode it only to determine that the overhead message is the same as the previous message that was decoded earlier, in the prior art a configuration sequence number is transmitted along with the overhead message. When the access terminal wakes up, it receives the configuration sequence number of the overhead message that the base station is attempting to transmit and decides whether to stay awake and receive the overhead message. In many instances, the access terminal will go back to sleep after receiving the sequence number because the sequence number is the same as the sequence number received the last time the access terminal woke up.

However, in prior art systems the access terminals erase old overhead messages they have previously received after transitioning into other states from a system idle state. For example, if an access terminal receives overhead messages when it wakes up during a slotted system idle state, and then transitions into a system traffic channel state (e.g., it engages in a data or voice call), it erases the overhead messages it received during the system idle state. When the access terminal then returns back to a system idle state it must again receive a plurality of overhead messages, even if the overhead messages were identical to the ones it previously used but erased. Moreover, in some cases prior art access terminals may also re-receive the same overhead messages after a fixed period of time (e.g., 600 seconds) regardless of whether the configuration sequence number and/or the content of the overhead messages have changed at the wireless network node.

Figure 4A:
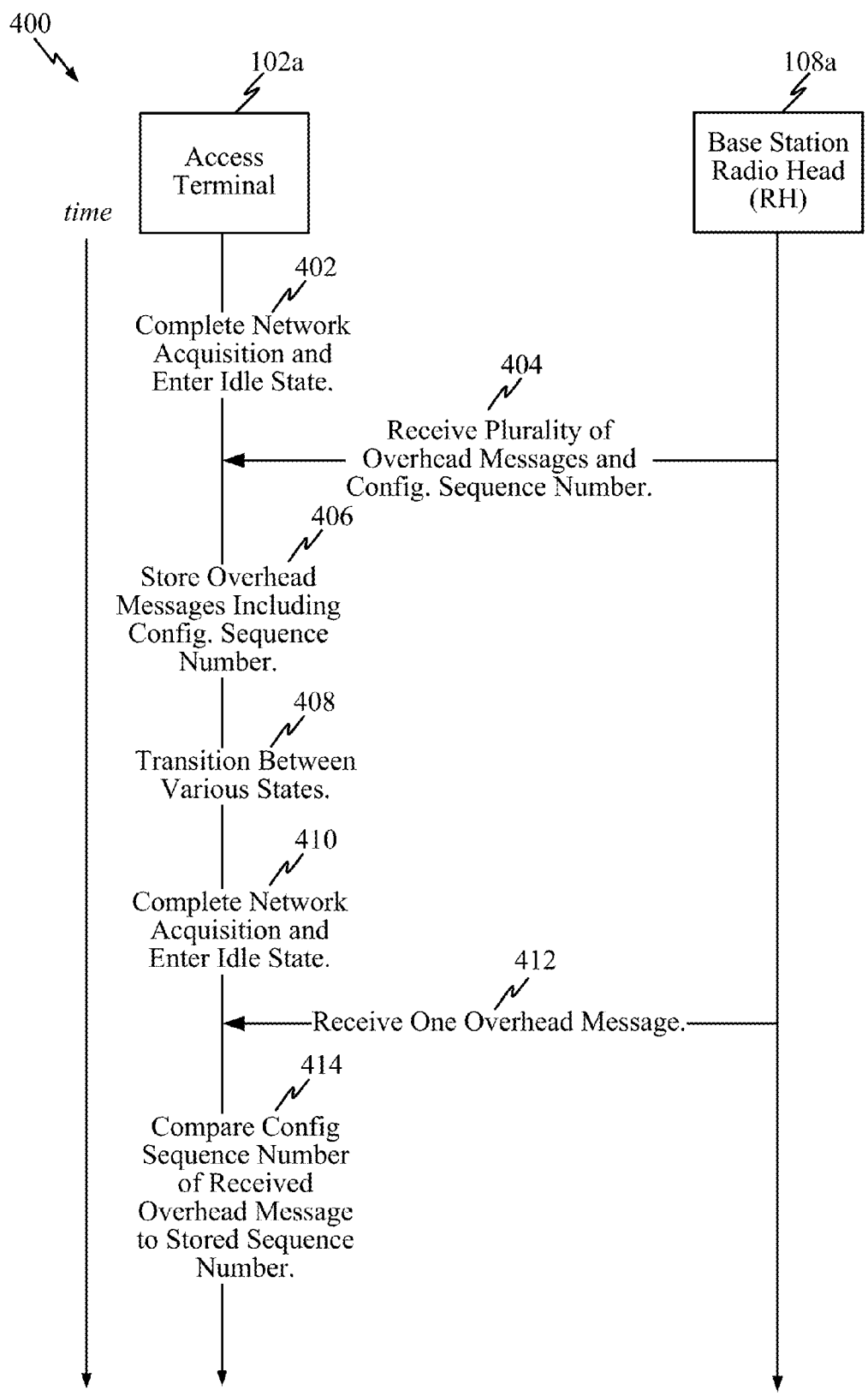
FIGS. 4A and 4B illustrate a diagram of an exemplary process for overhead message storage and retrieval by a stationary access terminal.
Figure 4B:
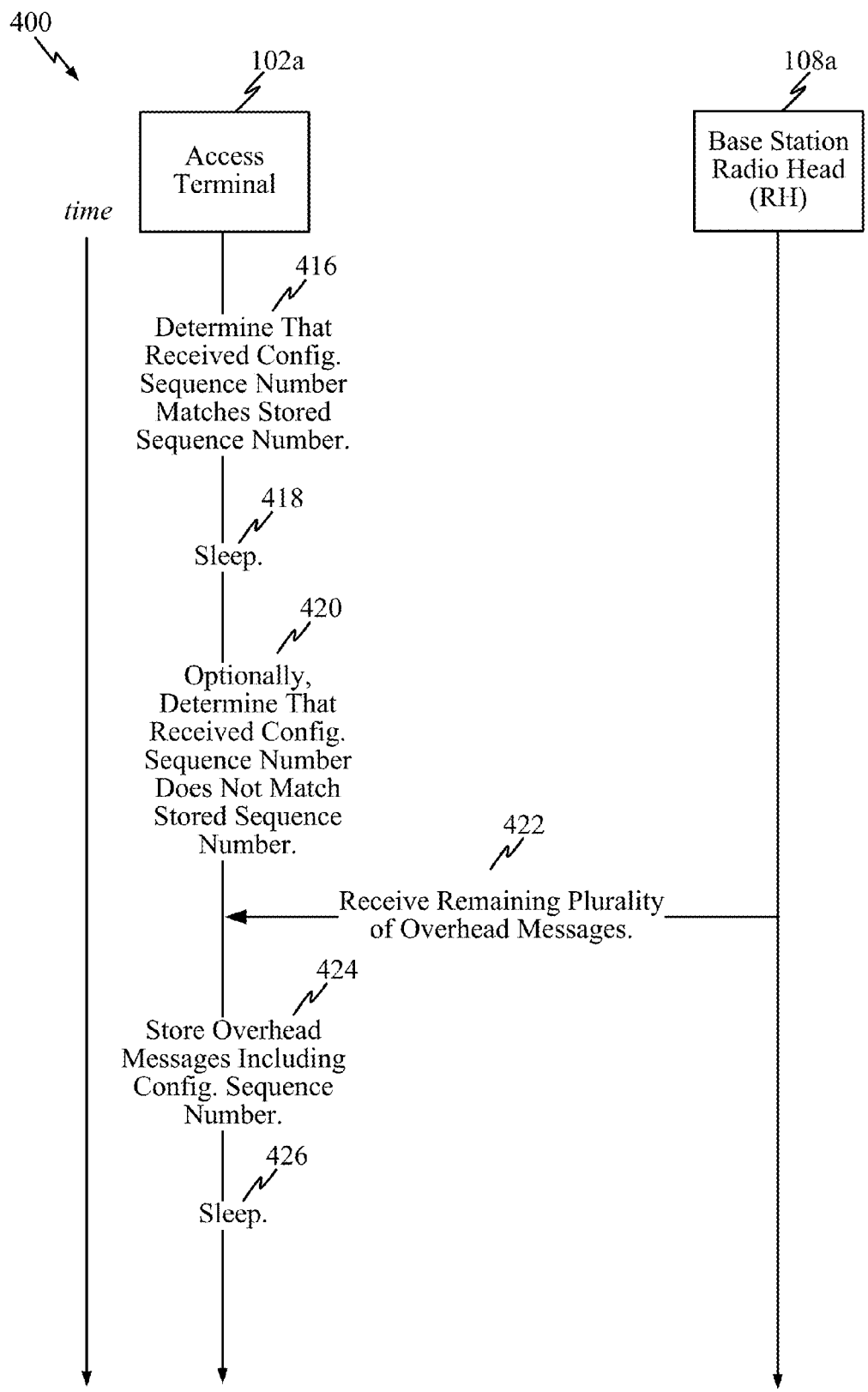

FIGS. 4A and 4B illustrate a diagram of an exemplary process 400 for overhead message storage and retrieval by a stationary access terminal according to one aspect of the disclosure. Referring to FIG. 4A, at step 402, the access terminal 102a completes network acquisition and enters into a slotted system idle state. For example, the access terminal 102a may have just entered into step 214, step 224, or step 312 (See FIGS. 2A, 2B, and 3). During the slotted system idle state, the access terminal 102a periodically wakes up and monitors/listens to the paging channels and/or broadcast channels for overhead messages. According to FIG. 4A, at step 404, the access terminal 102a receives a plurality of overhead messages from the base station 104a (e.g., the base station RH 108a). This may be the first time the access terminal 102a has been turned ON (i.e., the access terminal has just undergone an initial boot up event) or, as described in greater detail below, a configuration sequence number mismatch is detected. Along with the overhead messages, the access terminal 102a also receives a configuration sequence number associated with the overhead messages. At step 406, the access terminal 102a stores the plurality of overhead messages and the configuration sequence number associated with the received overhead messages in one or more memory circuits with which the access terminal 102a may be electrically or communicatively coupled to, or otherwise associated with. For example, the memory circuits may be non-volatile memory. In other aspects, the memory may be volatile memory that is continuously powered to retain the overhead messages and the configuration sequence number.

At step 408, the access terminal 102a may transition between one or more states. For example, the access terminal 102a may engage in active call and thus transition to a system access state and/or system traffic channel state (e.g., transmitting and/or receiving data traffic associated with a data or voice call). At some point the access terminal 102a may even power down to an OFF state or low power mode. Thus, according to one aspect, at step 408 the access terminal 102a may transition from a system idle state to a system non-idle state and then back again to a system idle state. System non-idle states are those states that do not include the system idle-state (i.e., the state where the access terminal predominately monitors a paging channel(s) to receive overhead messages from the base station), and may include, for example, the system initialization state, the system access state, and/or the system traffic channel state. At step 410, the access terminal 102a may again complete network acquisition and enter into a slotted system idle state (e.g., step 214 of FIG. 2A, step 224 of FIG. 2B, or step 312 of FIG. 3). This time the access terminal 102a may have entered into the system idle state after a subsequent boot up event (i.e., the access terminal 102a powers ON after being powered OFF) or a wake up event (i.e., the access terminal 102a has returned to full power from a low power mode of operation). At step 412, however, the access terminal 102a may instead only receive one overhead message along with a configuration sequence number associated with the received overhead message. In other aspects of the disclosure, the access terminal 102a may receive only the configuration sequence number. In either case, at step 414, the access terminal 102a then compares the received configuration sequence number with the stored configuration sequence number.

Referring to FIG. 4B, at step 416, the access terminal 102a determines that the received configuration sequence number matches the stored configuration sequence number. For example, the access terminal 102a may determine that the configuration sequence number received is identical to or otherwise a function of the stored configuration sequence number. In that case, at step 418, the access terminal 102a may forgo receiving additional overhead messages and directly enter a sleep state within a slotted system idle state. Alternatively, at step 420, the access terminal 102a may determine that the received configuration sequence number does not match (e.g., it is not identical to or otherwise a function of) the stored configuration sequence number. In that case, at step 422, the access terminal 102a may receive the remaining plurality of overhead messages, and at step 424 the access terminal 102a may store the received overhead messages and the received configuration sequence number associated with the received overhead messages. At step 426, the access terminal 102a may enter a sleep state within a slotted system idle state.

In this fashion, the access terminal 102a stores overhead messages for later use during subsequent iterations. Since the access terminal 102a is stationary, the surrounding RF environment will likely not change and it is very probable that it will receive the same overhead messages every time it acquires a network connection with the same base station. Thus, it is advantageous to store the overhead messages received and forgo receiving the same overhead messages if possible. Doing so improves performance of the access terminal by reducing current consumption associated with receiving unnecessary messages and also results in quicker completion of overhead message reception (i.e., access terminal can enter system idle state quicker). By contrast, in the prior art overhead messages are deleted after each state transition (e.g., after the access terminal is engaged in a call or turns OFF) thereby necessitating the mobile device to receive overhead messages again. Often times this is not an issue because the mobile device may have be actively moving through various cells and/or sectors of the network and thus receiving new overhead messages may be necessary. However, such prior art techniques are disadvantageous and inefficient where the access terminal device is stationary.

Figure 5:
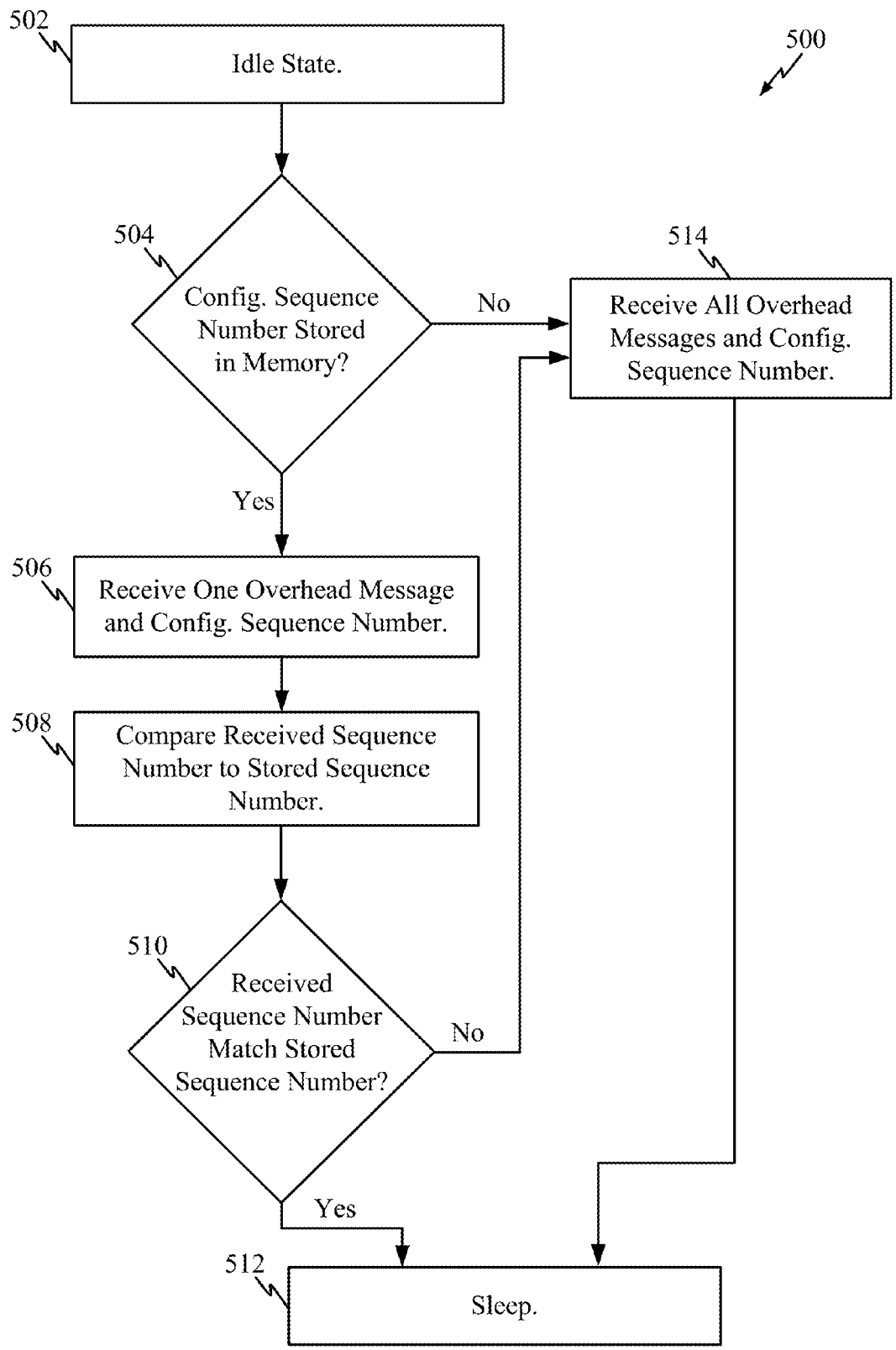
FIG. 5 illustrates a flow diagram of an exemplary process for overhead message storage and retrieval by a stationary access terminal.

FIG. 5 illustrates a flow diagram of an exemplary process 500 for overhead message storage and retrieval by a stationary access terminal according to one aspect of the disclosure. At step 502, the access terminal 102a may have just completed network acquisition and is in a slotted system idle state. At step 504, the access terminal 102a determines whether it has previously stored overhead messages and a configuration sequence number associated with stored overhead messages in memory. If the access terminal 102a determines that it has indeed stored overhead messages and a configuration sequence number in memory then, at step 506, the access terminal 102a receives a single overhead message and a configuration sequence number associated with the received single overhead message from the base station 104a (e.g., base station RH 108a). In some aspects, the access terminal 102a may simply receive the configuration sequence number associated with the single overhead message and not the overhead message itself. In either case, at step 508, the access terminal 102a compares the received configuration sequence number with the stored configuration sequence number.

At step 510, the access terminal 102a determines whether the received configuration sequence number matches the stored configuration sequence number. For example, the access terminal 102a may determine that the configuration sequence number received is identical to or otherwise a function of the stored configuration sequence number. If the access terminal 102a determines that the two are a match, then at step 512, it forgoes receiving additional overhead messages and directly enters a sleep state within the slotted system idle state. However, if the access terminal 102a determines that it does not have a configuration sequence number and/or overhead message(s) stored in memory, or if the access terminal 102a determines that the received configuration sequence number does not match (e.g., it is not identical to or otherwise a function of) the stored configuration sequence number, then at step 514, the access terminal 102a may receive all the overhead messages and the configuration sequence number associated with the overhead messages from the base station 104a. Note that in the case where the access terminal 102a has already received the single overhead message and associated configuration sequence number it does not have to receive that information again and may simply receive the remaining overhead messages, if any. Finally, at step 516, the access terminal 102a may enter into a sleep state within the slotted system idle state.

Figure 6A:
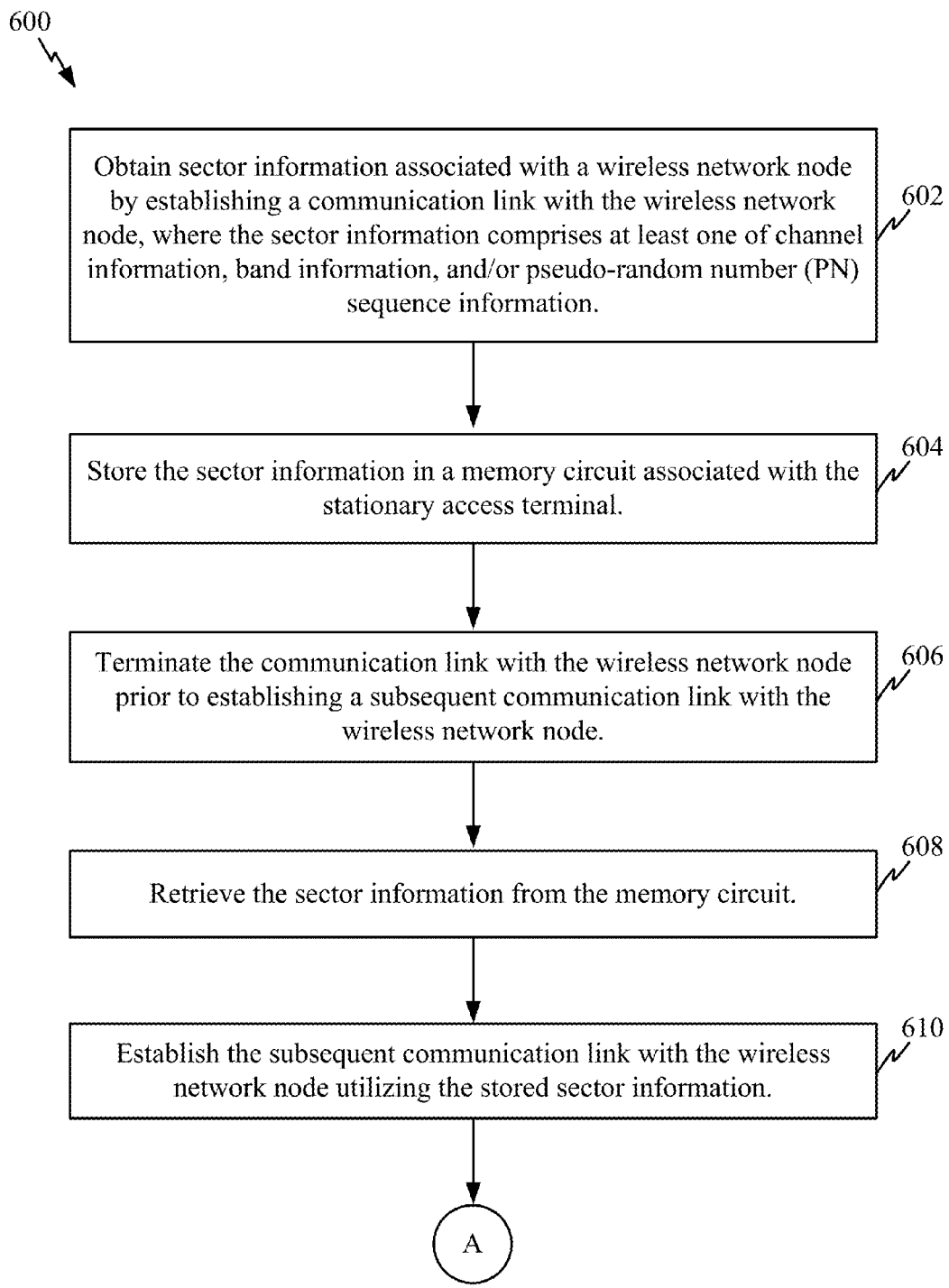
FIGS. 6A, 6B, 7A, and 7B illustrate methods operational at a stationary access terminal for network acquisition by the access terminal with a base station, and overhead message storage and retrieval by the access terminal.
Figure 6B:
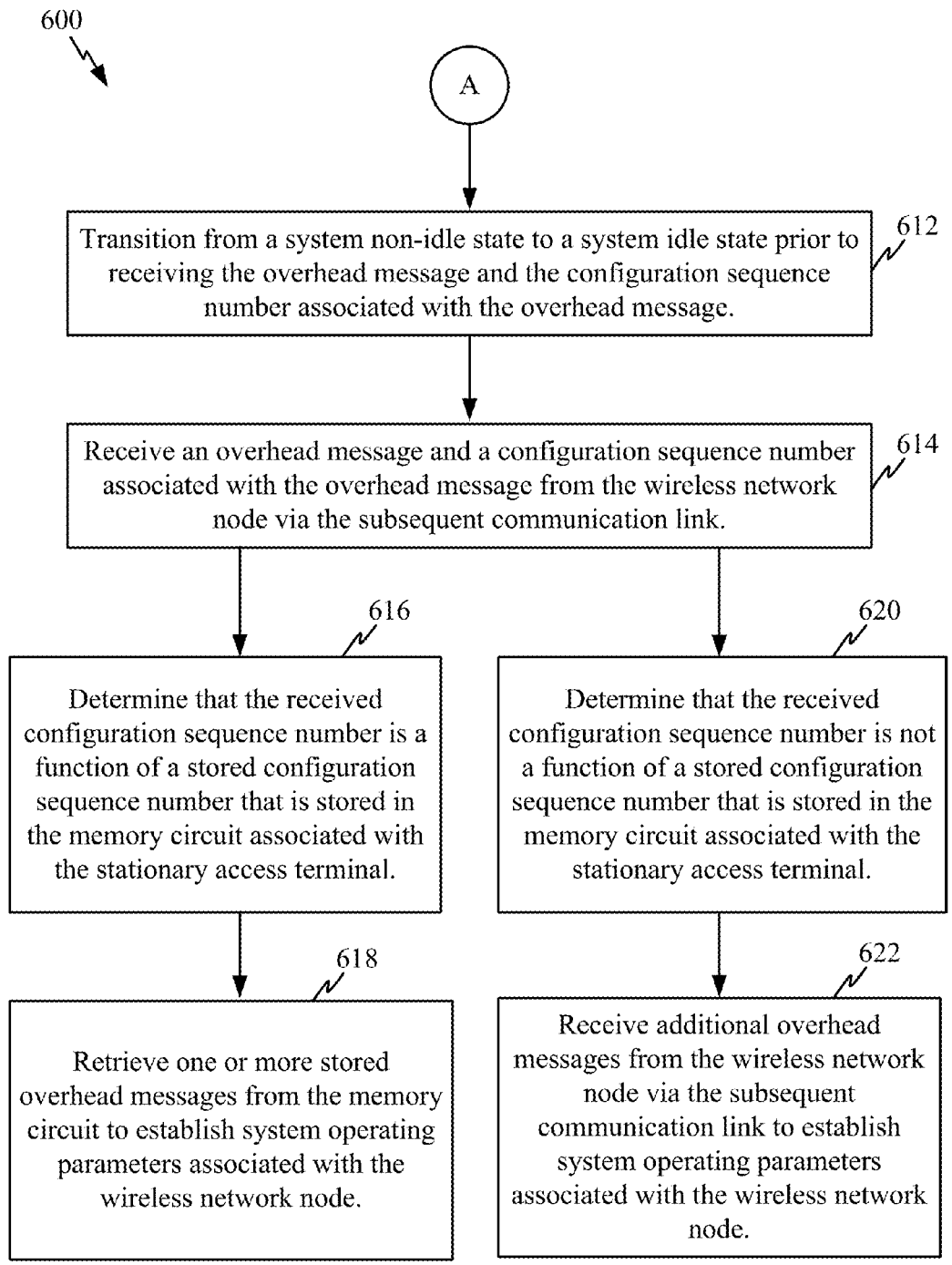

FIGS. 6A and 6B illustrate a method 600 operational at a stationary access terminal for network acquisition by the access terminal with a base station, and overhead message storage and retrieval by the access terminal. Referring to FIG. 6A, at step 602, the stationary access terminal obtains sector information associated with a wireless network node (e.g., a base station or a base station radio head) by establishing a communication link with the wireless network node, where the sector information comprises at least one of channel information, band information, and/or pseudo-random number (PN) sequence information. For example, the access terminal may obtain the sector information after performing an initial boot up event. At step 604, the stationary access terminal stores the sector information in a memory circuit (e.g., non-volatile memory) associated with the stationary device. At step 606, the stationary access terminal may terminate the communication link with the wireless network node prior to establishing a subsequent communication link with the wireless network node. At step 608, the stationary access terminal retrieves the sector information from the memory circuit. At step 610, the stationary access terminal establishes a subsequent communication link with the wireless network node utilizing the stored sector information. In one aspect, the subsequent communication link may be established with the wireless network node utilizing the stored sector information after the access terminal performs a subsequent boot up event or a wake up event (the initial boot up event occurring before the subsequent boot up event or the wake up event).

Referring to FIG. 6B, at step 612, the access terminal transitions from a system non-idle state (e.g., a system initialization state, a system traffic channel state, or a system access state) to a system idle state prior to receiving the overhead message and the configuration sequence number associated with the overhead message. At step 614, the remote access terminal receives an overhead message and a configuration sequence number associated with the overhead message from the wireless network node via the subsequent communication link. At step 616, the remote access terminal may determine that the received configuration sequence number is a function of a stored configuration sequence number that is stored in the memory circuit associated with the stationary device. If so, at step 618, the remote access terminal retrieves one or more stored overhead messages from the memory circuit to establish system operating parameters associated with the wireless network. However, at step 620, the remote access terminal may determine that the received configuration sequence number is not a function of a stored configuration sequence number that is stored in the memory circuit associated with the stationary device. If so, at step 622, the remote access terminal receives additional overhead messages from the wireless network node via the subsequent communication link to establish system operating parameters associated with the wireless network node.

According to one aspect, the access terminal may receive at least one overhead message and a configuration sequence number associated with the overhead message from the wireless network node via the communication link after an initial boot up event. The access terminal may store the overhead message and the configuration sequence number in its memory circuit. The access terminal may then retrieve the overhead message stored in the memory circuit after a subsequent boot up event or a wake up event to establish system operating parameters associated with the wireless network node, where the initial boot up event occurs before the subsequent boot up event or the wake up event.

Figure 7A:
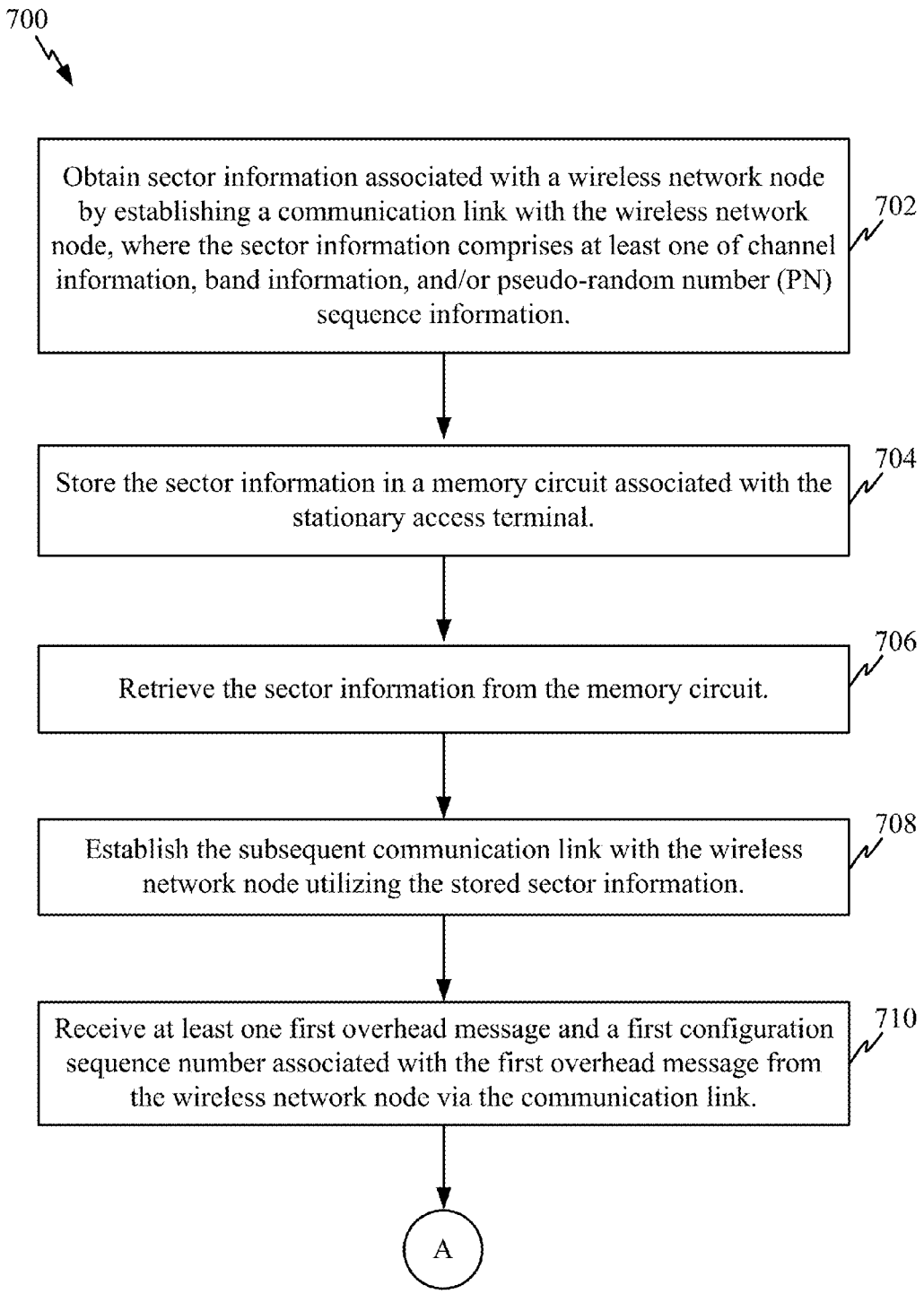
Figure 7B:
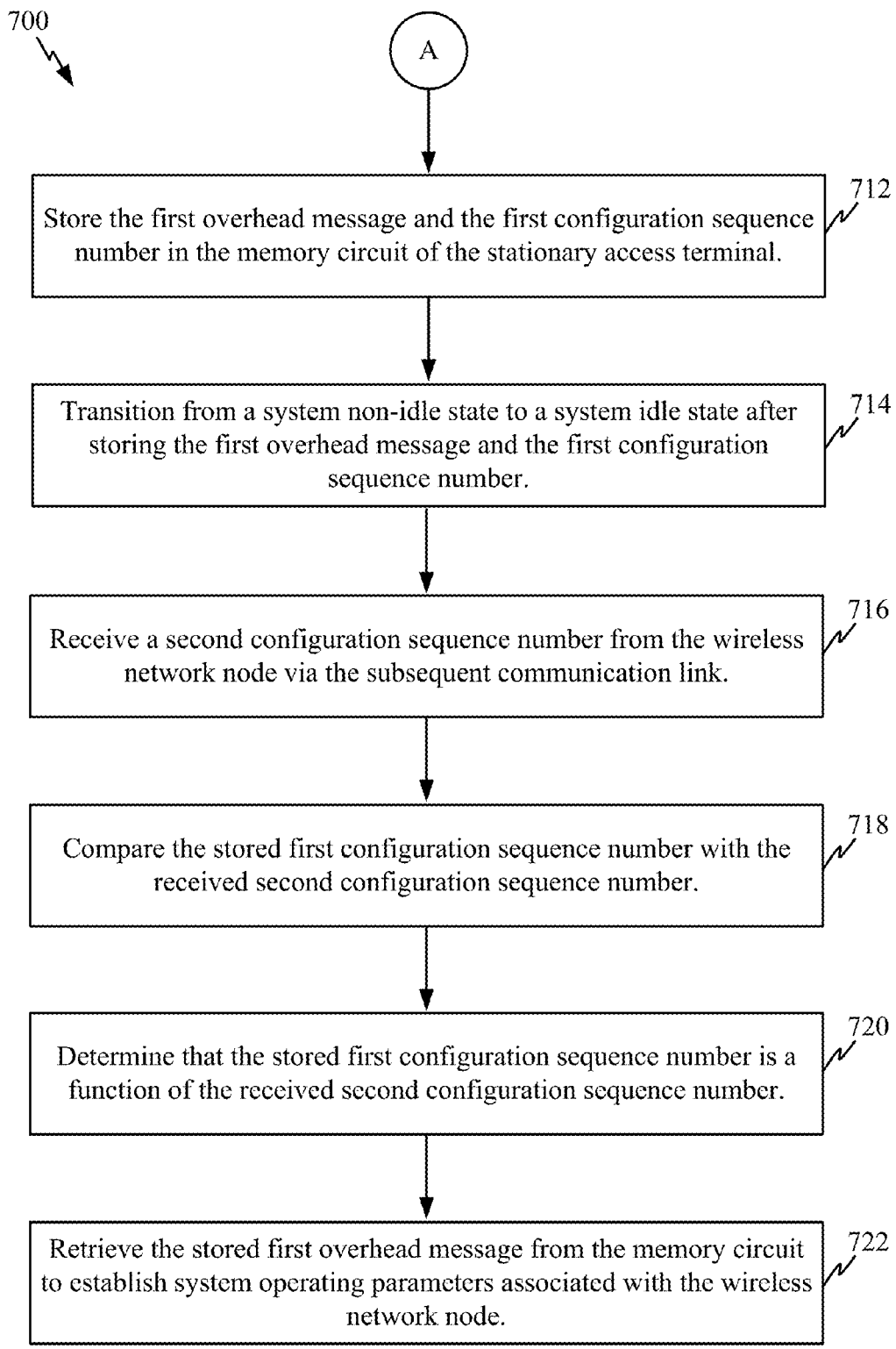

FIGS. 7A and 7B illustrate a method 700 operational at a stationary access terminal for network acquisition by the access terminal with a base station, and overhead message storage and retrieval by the access terminal. Referring to FIG. 7A, at step 702, the stationary access terminal obtains sector information associated with a wireless network node (e.g., a base station or a base station radio head) by establishing a communication link with the wireless network node, where the sector information comprises at least one of channel information, band information, and/or pseudo-random number (PN) sequence information. For example, the access terminal may obtain the sector information after performing an initial boot up event. At step 704, the stationary access terminal stores the sector information in a memory circuit (e.g., non-volatile memory) associated with the stationary device. At step 706, the stationary access terminal retrieves the sector information from the memory circuit. At step 708, the stationary access terminal establishes a subsequent communication link with the wireless network node utilizing the stored sector information. At step 710, the access terminal receives at least one first overhead message and a first configuration sequence number associated with the first overhead message from the wireless network node via the communication link.

Referring to FIG. 7B, at step 712, the access terminal stores the first overhead message and the first configuration sequence number in the memory circuit of the access terminal. At step 714, the access terminal transitions from a system non-idle state to a system idle state after storing the first overhead message and the first configuration sequence number. At step 716, the access terminal receives a second configuration sequence number from the wireless network node via the subsequent communication link. At step 718, the access terminal compares the stored first configuration sequence number with the received second configuration sequence number. At step 720, the access terminal determines that the stored first configuration sequence number is a function of the received second configuration sequence number. Finally, at step 722, the access terminal retrieves the stored first overhead message from the memory circuit to establish system operating parameters associated with the wireless network node. According to one aspect of the disclosure, the access terminal may receive a second overhead message along with the second configuration sequence number, where the second configuration sequence number is associated with the second overhead message. According to another aspect, the access terminal may retrieve the stored sector information and the stored overhead message from the memory circuit to establish the system operating parameters associated with the wireless network node.

Figure 8:
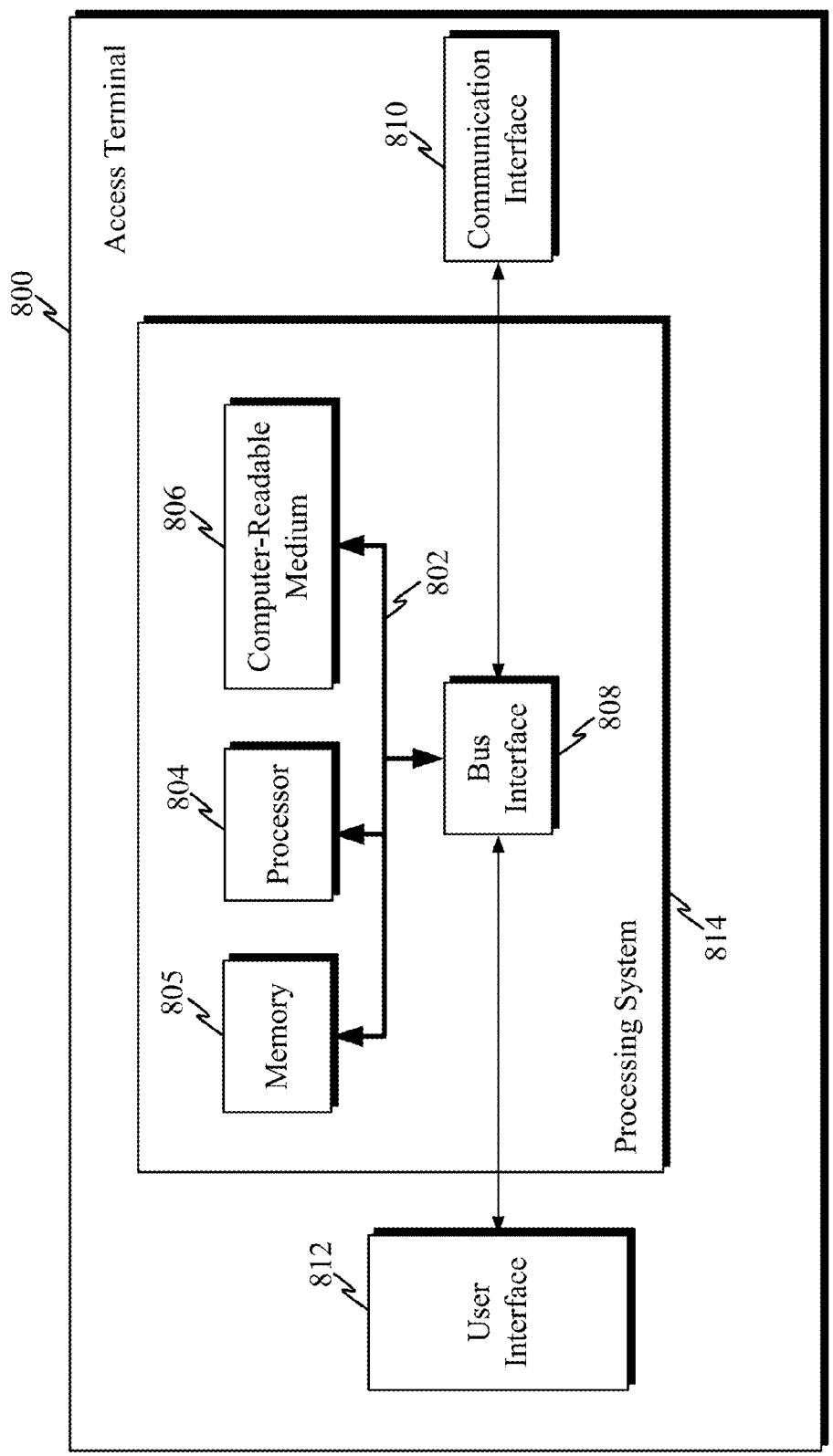
FIG. 8 illustrates a conceptual block diagram of a hardware implementation for a stationary access terminal.

FIG. 8 illustrates a conceptual block diagram of a hardware implementation for a stationary access terminal 800. The access terminal 800 may be representative of any of the access terminals 102a, 102b, 102c, 102d described above. The access terminal 800 may include a communication interface 810, a user interface 812, and a processing system 814. The processing system 814 may include a processor 804, a memory 805, a computer-readable medium 806, a bus interface 808, and a bus 802. The processing system 814 may be adapted to perform any of the steps, functions, and/or processes performed by a stationary access terminal 102a depicted in FIGS. 2A, 2B, 3, 4A, 4B, 5, 6A, 6B, 7A, and/or 7B.

The processor 804 (e.g., processing circuit) may be one or more processors that are adapted to process data for the access terminal 800. For example, the processing circuit 804 may be a specialized processor, such as an application specific integrated circuit (ASIC) that serves as a: means for obtaining sector information associated with a wireless network node by establishing a communication link with the wireless network node, the sector information comprising at least one of channel information, band information, and/or pseudo-random number (PN) information; means for storing the sector information in a memory circuit of the access terminal; means for retrieving the sector information from the memory circuit; and means for establishing a subsequent communication link with the wireless network node utilizing the stored sector information. Examples of processors 804 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. The processor 804 is also responsible for managing the bus 802, and executing software stored on the computer-readable medium 806 and/or memory 805. The software, when executed by the processor 804, causes the processing system 814 to perform the various functions, steps, and/or processes describe above for any of the stationary access terminals 102a, 102b, 102c, 102d. The computer-readable medium 806 may be used for storing data that is manipulated by the processor 804 when executing software.

The memory circuit 805 may be non-volatile memory, such as but not limited to FLASH memory, magnetic or optical hard disk drives, etc. For example, the memory circuit 805 may be non-volatile memory that serves as a means for storing the sector information in a memory circuit associated with the stationary device, and a means for storing overhead messages and configuration sequence numbers associated with those overhead messages. In some aspects, the memory storing the sector information and/or overhead messages (including configuration sequence number) may be volatile memory, such as DRAM (e.g., DDR SDRAM), SRAM, etc. that may be continuously powered so as to store the information indefinitely.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 806. The computer-readable medium 806 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 806 may reside in the processing system 814, external to the processing system 814, or distributed across multiple entities including the processing system 814. The computer-readable medium 806 may be embodied in a computer program product.

In this example, the processing system 814 may be implemented with a bus architecture, represented generally by the bus 802. The bus 802 may include any number of interconnecting buses and bridges depending on the specific application of the processing system 814 and the overall design constraints. The bus 802 links together various circuits including one or more processors (represented generally by the processor 804), a memory 805, and computer-readable media (represented generally by the computer-readable medium 806). The bus 802 may also link various other circuits such as timing sources, peripherals, voltage regulators, and power management circuits, which are well known in the art, and therefore, will not be described any further. A bus interface 808 provides an interface between the bus 802 and the communication interface 810. The communication interface 810 provides a means for communicating with other apparatus over a transmission medium. The communication interface 810 may be a wireless transceiver that allows the access terminal 800 to communicate with one or more wireless network nodes, such as one or more base stations and/or base station radio heads. Depending upon the nature of the apparatus, a user interface 812 (e.g., keypad, display, speaker, microphone, touchscreen display, etc.) may also be provided.

One or more of the components, steps, features, and/or functions illustrated in FIGS. 1, 2A, 2B, 3, 4A, 4B, 5, 6A, 6B, 7A, 7B, and/or 8 may be rearranged and/or combined into a single component, step, feature or function or embodied in several components, steps, or functions. Additional elements, components, steps, and/or functions may also be added without departing from the invention. The apparatus, devices, and/or components illustrated in FIG. 1 and/or 8 may be configured to perform one or more of the methods, features, or steps described in FIGS. 2A, 2B, 3, 4A, 4B, 5, 6A, 6B, 7A, and/or 7B. The algorithms described herein may also be efficiently implemented in software and/or embedded in hardware.

Moreover, in one aspect of the disclosure, the processing circuit 804 illustrated in FIG. 8 may be a specialized processor (e.g., an application specific integrated circuit (e.g., ASIC)) that is specifically designed and/or hard-wired to perform the algorithms, methods, and/or steps described in FIGS. 2A, 2B, 3, 4A, 4B, 5, 6A, 6B, 7A, and/or 7B. Thus, such a specialized processor (e.g., ASIC) may be one example of a means for executing the algorithms, methods, and/or steps described in FIGS. 2A, 2B, 3, 4A, 4B, 5, 6A, 6B, 7A, and/or 7B. The computer-readable storage medium 806 may also store processor 804 readable instructions that when executed by a specialized processor (e.g., ASIC) causes the specialized processor to perform the algorithms, methods, and/or steps described in FIGS. 2A, 2B, 3, 4A, 4B, 5, 6A, 6B, 7A, and/or 7B.

Also, it is noted that the aspects of the present disclosure may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices and/or other machine-readable mediums and, processor-readable mediums, and/or computer-readable mediums for storing information. The terms "machine-readable medium", "computer-readable medium", and/or "processor-readable medium" may include, but are not limited to non-transitory mediums such as portable or fixed storage devices, optical storage devices, and various other mediums capable of storing, containing or carrying instruction(s) and/or data. Thus, the various methods described herein may be fully or partially implemented by instructions and/or data that may be stored in a "machine-readable medium", "computer-readable medium", and/or "processor-readable medium" and executed by one or more processors, machines and/or devices.

Furthermore, aspects of the disclosure may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing aspects of the disclosure are merely examples and are not to be construed as limiting the invention. The description of the aspects of the present disclosure is intended to be illustrative, and not to limit the scope of the claims. As such, the present teachings can be readily applied to other types of apparatuses and many alternatives, modifications, and variations will be apparent to those skilled in the art.

What is claimed is:

1. A method for wireless communication operable at a stationary access terminal, the method comprising:
   obtaining sector information associated with a wireless network node by establishing a communication link with the wireless network node;
   receiving an overhead message containing overhead information different than the sector information during a first system idle state from the wireless network node via the communication link;
   storing the overhead information received in the overhead message and the sector information in a memory circuit associated with the stationary access terminal;
   transitioning from the first system idle state to a power off state and from the power off state to a second system idle state after powering on and undergoing a boot up event, wherein the storing of the overhead information and the sector information in the memory circuit continues through the transitioning;
   retrieving the sector information from the memory circuit after undergoing the boot up event;
   establishing a subsequent communication link with the wireless network node utilizing the sector information retrieved from the memory circuit;
   retrieving the overhead information from the memory circuit after establishing the subsequent communication link with the wireless network node and in the second system idle state; and
   attempting to establish system operating parameters associated with the wireless network node using the overhead information retrieved from the memory circuit.

2. The method of claim 1, further comprising:
   searching a plurality of combinations of band, channel, and PN sequence according to a preferred roaming list to establish the communication link with the wireless network node.

3. The method of claim 1, further comprising:
   terminating the communication link with the wireless network node prior to establishing an additional communication link with the wireless network node.

4. The method of claim 1, wherein transitioning from the first system idle state to a power off state and from the power off state to a second system idle state after powering on and undergoing a boot up event further includes:
   transitioning from the first system idle state to a non-idle state, from the non-idle state to the power off state and from the power off state to the second system idle state after powering on and undergoing a boot up event, wherein the system non-idle state is either a system initialization state, a system access state, or a system traffic channel state.

5. The method of claim 1, wherein the overhead information includes a stored configuration sequence number that is stored in the memory circuit and attempting to establish system operating parameters further includes:
   determining that a received configuration sequence number received from the wireless network node does not match the stored configuration sequence number; and
   receiving additional overhead messages from the wireless network node via a subsequent communication link to establish system operating parameters associated with the wireless network node.

6. The method of claim 1, wherein the overhead information includes a stored configuration sequence number that is stored in the memory circuit and attempting to establish system operating parameters further includes:
   determining that a received configuration sequence number received from the wireless network node matches the stored configuration sequence number; and
   retrieving one or more stored overhead messages from the memory circuit to establish system operating parameters associated with the wireless network node.

7. The method of claim 6, wherein the stored overhead messages indicate at least one of a slot cycle index value, an initial transmit power for the stationary access terminal, and/or a search window size for pilot channel detection.

8. The method of claim 6, wherein the received configuration sequence number is equal to the stored configuration sequence number.

9. The method of claim 1, wherein the wireless network node is a base station and the stationary access terminal is a stationary sensor device.

10. The method of claim 1, wherein obtaining the sector information further includes:
obtaining the sector information after an initial boot up event of the stationary access terminal, wherein the sector information comprises channel information, band information, and pseudo random number (PN) sequence information.

11. The method of claim 10, wherein establishing the subsequent communication link with the wireless network node further includes:
establishing the subsequent communication link utilizing the sector information after the boot up event of the stationary access terminal, the initial boot up event occurring before the boot up event.

12. The method of claim 1, wherein storing the overhead information further comprising:
receiving a first configuration sequence number associated with the overhead message from the wireless network node via the communication link; and
storing the first configuration sequence number as the overhead information in the memory circuit of the stationary access terminal.

13. The method of claim 12, wherein attempting to establish system operating parameters further includes:
receiving a second configuration sequence number from the wireless network node via a subsequent communication link;
comparing the stored first configuration sequence number with the received second configuration sequence number;
determining that the stored first configuration sequence number matches the received second configuration sequence number; and
retrieving one or more stored overhead messages from the memory circuit to establish system operating parameters associated with the wireless network node.

14. The method of claim 13, further comprising:
receiving a second overhead message along with the second configuration sequence number, the second configuration sequence number associated with the second overhead message.

15. The method of claim 13, wherein receiving the overhead message and the first configuration sequence number from the wireless network node via the communication link occurs after an initial boot up event.

16. The method of claim 15, wherein retrieving the one or more stored overhead messages stored in the memory circuit of the stationary access terminal occurs after the boot up event or a wake up event, the initial boot up event occurring before the boot up event or the wake up event.

17. A stationary access terminal comprising:
a communication interface adapted to establish communications with a wireless network node; and
a processing circuit communicatively coupled to the communication interface, the processing circuit adapted to obtain sector information associated with the wireless network node by establishing a communication link with the wireless network node;
receive an overhead message containing overhead information different than the sector information during a first system idle state from the wireless network node via the communication link;
store the overhead information received in the overhead message and the sector information in a memory circuit associated with the stationary access terminal;
transition from the first system idle state to a power off state and from the power off state to a second system idle state after powering on and undergoing a boot up event, wherein a storing of the overhead information and the sector information in the memory circuit continues through the transition;
retrieve the sector information from the memory circuit after undergoing the boot up event;
establish a subsequent communication link with the wireless network node utilizing the sector information retrieved from the memory circuit;
retrieving the overhead information from the memory circuit after establishing the subsequent communication link with the wireless network node and in the second system idle state; and
attempting to establish system operating parameters associated with the wireless network node using the overhead information retrieved from the memory circuit.

18. The stationary access terminal of claim 17, wherein the processing circuit is further adapted to: search a plurality of band, channel, and PN sequence combinations according to a preferred roaming list to establish the communication link with the wireless network node.

19. The stationary access terminal of claim 17, wherein the processing circuit is further adapted to:
receive a first configuration sequence number associated with the overhead message from the wireless network node via the communication link; and
store the first configuration sequence number as the overhead information in the memory circuit of the stationary access terminal.

20. The stationary access terminal of claim 19, wherein the processing circuit is further adapted to:
receive a second configuration sequence number from the wireless network node via a subsequent communication link;
compare the stored first configuration sequence number with the received second configuration sequence number;
determine that the stored first configuration sequence number matches the received second configuration sequence number; and
retrieve one or more stored overhead message from the memory circuit to establish system operating parameters associated with the wireless network node.

21. The stationary access terminal of claim 20, wherein the processing circuit is further adapted to:
receive a second overhead message along with the second configuration sequence number, the second configuration sequence number associated with the second overhead message.

22. The stationary access terminal of claim 17, wherein the processing circuit is further adapted to:
transition from the first system idle state to a non-idle state, from the non-idle state to the power off state and from the power off state to the second system idle state after powering on and undergoing a boot up event, wherein the system non-idle state is either a system initialization state, a system access state, or a system traffic channel state.

23. The stationary access terminal of claim 20, wherein the one or more stored overhead messages indicate at least one of a slot cycle index value, an initial transmit power for the stationary access terminal, and/or a search window size for pilot channel detection.

24. The stationary access terminal of claim 20, wherein the processing circuit is adapted to receive the overhead message and the first configuration sequence number from the wireless network node via the communication link after an initial boot up event.

25. The stationary access terminal of claim 24, wherein the processing circuit is adapted to retrieve the one or more stored overhead messages stored in the memory circuit of the stationary access terminal after the boot up event or a wake up event, the initial boot up event occurring before the boot up event or the wake up event.

26. A stationary access terminal comprising:
   means for obtaining sector information associated with a wireless network node by establishing a communication link with the wireless network node;
   means for receiving an overhead message containing overhead information different than the sector information during a first system idle state from the wireless network node via the communication link;
   means for storing the overhead information received in the overhead message and the sector information in a memory circuit associated with the stationary access terminal;
   means for transitioning from the first system idle state to a power off state and from the power off state to a second system idle state after powering on and undergoing a boot up event, wherein a storing of the overhead information and the sector information in the memory circuit continues through a transitioning from the first system idle state to the power off state and from the power off state to the second system idle state;
   means for retrieving the sector information from the memory circuit after undergoing the boot up event;
   means for establishing a subsequent communication link with the wireless network node utilizing the sector information retrieved from the memory circuit;
   means for retrieving the overhead information from the memory circuit after establishing the subsequent communication link and in the second system idle state; and
   means for attempting to establish system operating parameters associated with the wireless network node using the overhead information retrieved from the memory circuit.

27. The stationary access terminal of claim 26, further comprising:
   means for receiving a first configuration sequence number associated with the overhead message from the wireless network node via the communication link;
   means for storing the first configuration sequence number as the overhead information in the memory circuit of the stationary access terminal;
   means for receiving a second configuration sequence number from the wireless network node via a subsequent communication link;
   means for comparing the stored first configuration sequence number with the received second configuration sequence number;
   means for determining that the stored first configuration sequence number ⊖ matches the received second configuration sequence number; and
   means for retrieving one or more stored overhead messages from the memory circuit to establish system operating parameters associated with the wireless network node.

28. The stationary access terminal of claim 27, wherein receiving the overhead message and the first configuration sequence number from the wireless network node via the communication link occurs after an initial boot up event.

29. The stationary access terminal of claim 28, wherein retrieving the one or more overhead messages stored in the memory circuit of the stationary access terminal occurs after the boot up event or a wake up event, the initial boot up event occurring before the boot up event or the wake up event.

30. The stationary access terminal of claim 26, wherein the system non-idle state is either a system initialization state, a system access state, or a system traffic channel state.

31. A non-transitory computer-readable medium having instructions stored thereon for wireless communication, the instructions which when executed by at least one processor cause the processor to:
   obtain sector information associated with the wireless network node by establishing a communication link with the wireless network node;
   receive an overhead message containing overhead information different than the sector information during a first system idle state from the wireless network node via the communication link;
   store the overhead information received in the overhead message and the sector information in a memory circuit associated with a stationary access terminal;
   transition from the first system idle state to a power off state and from the power off state to a second system idle state after powering on and undergoing a boot up event, wherein a storing of the overhead information and the sector information in the memory circuit continues through the transition;
   retrieve the sector information from the memory circuit after undergoing the boot up event;
   establish a subsequent communication link with the wireless network node utilizing the sector information retrieved from the memory circuit;
   retrieve the overhead information from the memory circuit after establishing the subsequent communication link and in the second system idle state; and
   attempt to establish system operating parameters associated with the wireless network node using the overhead information retrieved from the memory circuit.

32. The non-transitory computer-readable medium of claim 31, wherein the instructions which when executed by the processor further cause the processor to:
   receive a first configuration sequence number associated with the overhead message from the wireless network node via the communication link;
   store the first configuration sequence number as the overhead information in the memory circuit of the stationary access terminal;
   receive a second configuration sequence number from the wireless network node via a subsequent communication link;
   compare the stored first configuration sequence number with the received second configuration sequence number;
   determine that the stored first configuration sequence number matches the received second configuration sequence number; and retrieve one or more stored overhead messages from the memory circuit to establish system operating parameters associated with the wireless network node.

33. The non-transitory computer-readable medium of claim 32, wherein causing the processor to receive the overhead message and the first configuration sequence number from the wireless network node via the communication link occurs after an initial boot up event.

34. The non-transitory computer-readable medium of claim 33, wherein causing the processor to retrieve the one or more stored overhead messages stored in the memory circuit of the stationary access terminal occurs after the boot up event or a wake up event, the initial boot up event occurring before the boot up event or the wake up event.

35. The non-transitory computer-readable medium of claim 31, wherein the system non-idle state is either a system initialization state, a system access state, or a system traffic channel state.

* * * * *